June 9, 1953 H. S. ORR ET AL 2,641,674
METHOD OF JOINING THIN METALLIC SHEETS
Filed Dec. 3, 1951
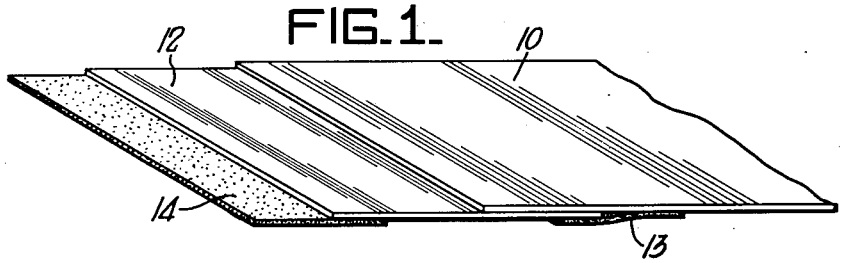
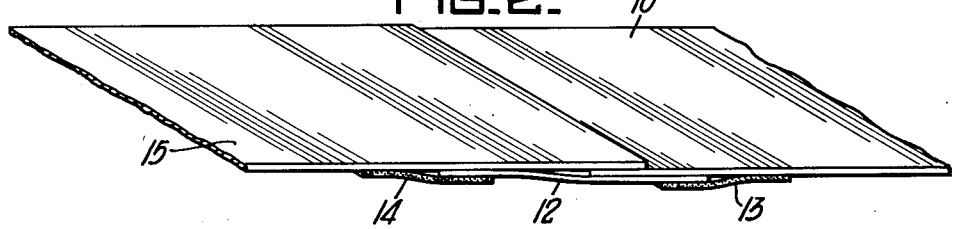
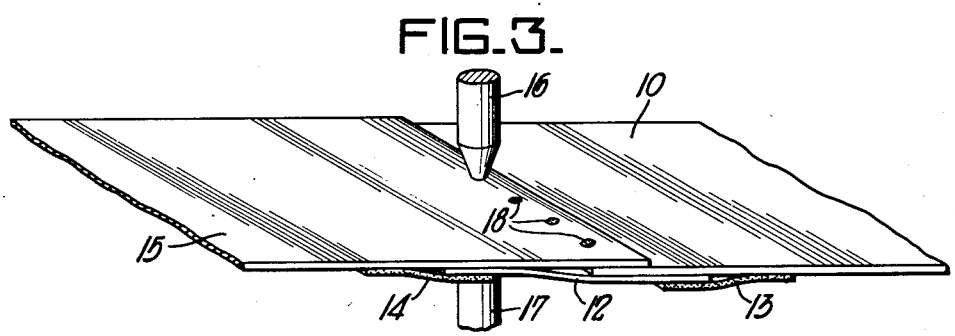
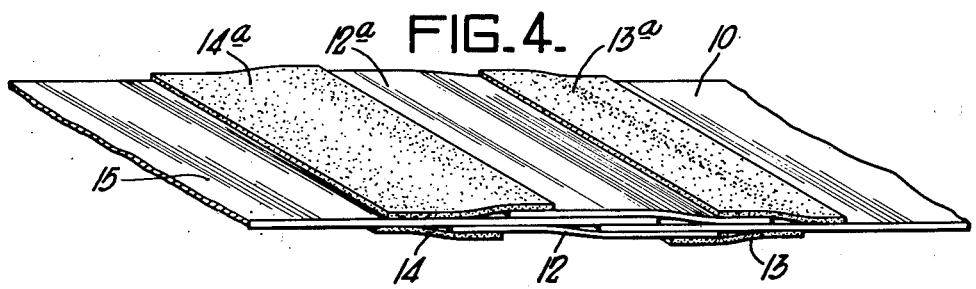
Inventors:
HOWARD S. ORR and
ALFRED TEPLITZ,
by: Donald G. Dalton
their Attorney.

Patented June 9, 1953

2,641,674

UNITED STATES PATENT OFFICE 2,641,674

METHOD OF JOINING THIN METALLIC SHEETS

Howard S. Orr and Alfred Teplitz, Pittsburgh, Pa., assignors to United States Steel Corporation, a corporation of New Jersey Application December 3, 1951, Serial No. 259,646

6 Claims. (Cl. 219—10)

This invention relates to improved methods of joining thin metallic sheets.

When very thin materials are welded, considerable difficulty is experienced in placing the materials together properly, in holding them in welding position, and in obtaining a flat joined weld portion. Often the weld portion becomes wrinkled and distorted, which is objectionable in many items, such as metallic belts and the like.

An object of the present invention is to provide an improved method of welding thin materials, which method overcomes the foregoing difficulties.

A further object is to provide an improved welding method in which highly conductive platens are used to extract heat rapidly from the weld and thereby prevent distortion of the parts.

In accomplishing these and other objects of the invention, we have provided improved details of structure, a single form of which is shown in the accompanying drawing, in which:

Figure 1 is a perspective view showing one step in preparing pieces for joining according to the method of the present invention;

Figure 2 is a similar view, but showing a subsequent step;

Figure 3 is another similar view showing the actual welding step; and

Figure 4 is a perspective view illustrating a modification.

Figure 1 shows a thin piece 10 of metal, commonly steel, to be welded to another piece. In accordance with the present invention, a platen 12 is attached to the underside of said piece by a strip 13 of adhesive tape or the like. A second strip 14 of such tape is joined to the free edge of the platen. The platen is a thin strip of highly conductive metal, such as copper, Phosphor bronze or aluminum. We have found aluminum foil to be readily available material well suited for the purpose. The thickness of the platen should be approximately equal to or less than the thickness of the piece 10.

Figure 2 shows the next step. The edge of a second piece 15 of metal is lapped over the edge of the first piece 10 the desired distance and is secured to the platen by the tape 14. The platen and the two strips of tape hold the pieces 10 and 15 with sufficient rigidity that they do not become misaligned.

Figure 3 shows the actual welding step. Resistance welding electrodes 16 and 17 are placed against the underside of the platen and the top of the piece 15. The electrodes are energized and moved along the lapped edges of pieces 10 and 15 to form a series of spot welds 18. The thin platen has high electrical conductivity and in no way interferes with operation of the welding equipment, but extracts heat rapidly from the strips 10 and 15. After completion of the weld, the platen and adhesive strips are removed.

Figure 4 shows a modification in which a second platen 12a is placed over the lapped edges of the pieces 10 and 15 and held by additional strips 13a and 14a of adhesive tape. This modification is used where greater rigidity and more rapid heat extraction are desired.

With either embodiment of the invention, the adhesive tape holds the metal pieces in proper relation for welding and holds them firmly enough that they do not become misaligned during handling. The platen extracts heat so rapidly from the pieces during the subsequent welding that they do not become wrinkled or distorted, but instead are connected by a flat joined weld.

While we have shown and described only a single embodiment of the invention, it is apparent that modifications may arise. Therefore, we do not wish to be limited to the disclosure set forth but only by the scope of the appended claims.

We claim:

1. A method of joining two thin metallic pieces comprising adhesively attaching a thin platen of metal whose conductivity is higher than that of said pieces to one of the pieces adjacent an edge thereof, lapping an edge of the other piece over this edge of the first piece and over said platen, adhesively attaching said platen to said second piece, and applying an electrical resistance weld to the lapped edges of the pieces through said platen.

2. A method of joining two thin steel pieces comprising adhesively attaching a thin platen of metal of the group consisting of copper, Phosphor bronze and aluminum to one of the pieces adjacent an edge thereof, lapping an edge of the other piece over this edge of the first piece and over said platen, adhesively attaching said platen to said second piece, and applying electrical resistance welds to the lapped edges of the pieces through said platen.

3. A method of joining two thin metallic pieces comprising adhesively attaching a thin platen of metal whose conductivity is higher than that of said pieces to one of the pieces adjacent an edge thereof, lapping an edge of the other piece over this edge of the first piece, adhesively attaching said platen to said second piece, adhesively attaching a second similar platen over said lapped edges on the opposite face from said first named platen, and applying electrical resistance welds to the lapped edges of the pieces through said platens.

4. In the joining of thin metallic pieces by electrical resistance welding, a method of holding the sheets in position preliminary to welding and rapidly extracting heat during welding comprising adhesively attaching a thin platen of metal whose conductivity is higher than that of said pieces to the pieces so that said platen covers lapped edges of the pieces, and applying the welds to said pieces through said platen.

5. A method as defined in claim 4 in which similar platens are adhesively attached to both faces of he pieces covering their lapped edges.

6. A method of joining two thin metallic pieces comprising adhesively attaching a platen of metal whose conductivity is higher than that of said pieces and whose maximum thickness is equal to the thickness of the pieces to one of the pieces adjacent an edge thereof, lapping an edge of the other piece over this edge of the first piece and over said platen, adhesively attaching said platen to said second piece, and applying electrical resistance welds to the lapped edges of the pieces through said platen.

HOWARD S. ORR.
ALFRED TEPLITZ.

References Cited in the file of this patent
UNITED STATES PATENTS

| Number | Name | Date |
| --- | --- | --- |
| 2,250,617 | Argentin | July 29, 1941 |